United States Patent
Brueckheimer et al.

(10) Patent No.: US 6,493,344 B1
(45) Date of Patent: Dec. 10, 2002

(54) TELECOMMUNICATIONS SYSTEM

(75) Inventors: Simon Daniel Brueckheimer, London (GB); Roy Harold Mauger, Herts (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/341,251

(22) PCT Filed: Feb. 19, 1998

(86) PCT No.: PCT/GB98/00520
§ 371 (c)(1),
(2), (4) Date: Jul. 14, 1999

(87) PCT Pub. No.: WO98/37729
PCT Pub. Date: Aug. 27, 1998

(30) Foreign Application Priority Data

Feb. 21, 1997 (GB) .............................................. 9703650

(51) Int. Cl.[7] .............................................. H04L 12/28
(52) U.S. Cl. .................................. 370/395.1; 370/395.6
(58) Field of Search ................................. 370/230, 237, 370/238, 238.1, 351, 400, 395.2, 395.6, 395.61, 218, 395, 395.1

(56) References Cited

U.S. PATENT DOCUMENTS 5,781,529 A * 7/1998 Liang et al. ................. 370/218
6,148,001 A * 11/2000 Soirinsuo et al. ........... 370/420
6,341,131 B1 * 1/2002 Eneroth et al. ............. 370/395

OTHER PUBLICATIONS

Iwata, "ATM Routing Algorithms with Multiple QOS Reuirements for Multimedia Internetworking", IEICE Transaction, vol E79–B, No. 8, 8/96, pp. 999–1007.*
Iwata, "ATM Routing Algorithms with Multiple QOS Requirements for Multimedia Internetworking", IEICE Transactions, vol. E79–B, No. 8, 8/96, pp. 999–1007.
Wells, "The New Route to ATM Internetworking", Telecommunications, vol. 30, No. 7, 7/96, pp. 40, 44, 46.
Johnsson, "Support for Law Bitrate Applications in ATM Networks", Proceedings of IFIP Workshop, Jun. 3, 1996, pp. 39/1–39/14.

* cited by examiner

Primary Examiner—David Vincent
Assistant Examiner—Robert W. Wilson
(74) Attorney, Agent, or Firm—Lee, Mann, Smith, McWilliams, Sweeney & Ohlson

(57) ABSTRACT

An asynchronous transfer mode adaptation layer switching network has independent call routing and connection control for setting up connections across the system. A plurality of adaptation layer switches (ALS) coupled to the ATM network comprise a group adapted to function as an adaptation layer switching network whose fabric and control are distributed over the group. The network having means for determining its current system status whereby to set up multimedia calls across the network based on that status determination.

13 Claims, 4 Drawing Sheets

TELECOMMUNICATIONS SYSTEM

This invention relates to digital communications systems and in particular to systems embodying asynchronous transfer mode (ATM) technology. The invention further relates to the application of PNNI (Private Network Network Interface) signalling to control an ATM adaptation layer switching network.

BACKGROUND OF THE INVENTION

The asynchronous transfer mode (ATM) technology is a flexible form of transmission which allows any type of service traffic, voice, video or data, to be multiplexed together on to a common means of transmission. In order for this to be realised, the service traffic must first be adapted typically into 53 byte cells comprising 5 byte headers and 48 byte payloads such that the original traffic can be reconstituted at the far end of an ATM network. This form of adaptation is performed in the ATM adaptation layer (AAL).

A recent development has been the introduction of the AAL-2 adaptation layer. This adaptation layer has been optimised to accommodate the demands of low bit-rate communications representing the increasing trend to greater voice compression. The adaptation layer is a multiplex of users in a single ATM connection where each user's information is carried in short packets or minicells each with a header identifying the user channel and incorporating ancillary control information. This constitutes a dynamic trunk group of users in a single connection.

As telecommunications networks increase in complexity and carry increasing volumes of traffic, the current procedures for setting up connections between subscribers are limiting the performance of these networks. In particular, congestion may be caused by attempting to connect to a subscriber who is already busy, or by attempting to choose a route through an already congested part of the network. Thus equipment and resources can be wasted in attempts to set up calls which cannot be completed. A further problem is that of scalability. As the network expands to accommodate increased traffic and a larger number of subscribers, there is an increasing need to facilitate integration of new equipment into an existing network without simply increasing the congestion problem. Moreover, careful planning is required to ensure that calls can be routed through the network. This requires an ad-hoc distributed routing decision policy which limits the flexibility of the routing process as the call routing must be collocated with the switching node fabric.

SUMMARY OF THE INVENTION

The object of the invention is to minimise or to overcome these disadvantages.

A further object of the invention is to provide an improved method of operating a telecommunications network.

According to one aspect of the present invention there is provided a asynchronous transfer mode adaptation layer switching network having independent call routing and connection control for setting up connections across the system.

According to another aspect of the present invention there is provided a distributed telecommunications exchange system having means for determining at a call source the current status of the system whereby to effect routing of a multimedia call across the system.

According to another aspect of the invention there is provided a method of communicating resource availability to maintain performance of an asynchronous transfer mode adaptation layer switching network under overload conditions.

According to a further aspect of the invention there is provided a method of routing telecommunications traffic in a system including an asynchronous transfer mode (ATM) network having uncommitted bandwidth, and a plurality of adaptation layer switches (ALS) coupled to the ATM network, which adaptation layer switches comprise a group adapted to function as an adaptation layer switching network whose fabric and control are distributed over the group, the method including determining the current system status whereby to set up multimedia calls across the network based on that status determination.

We have found that adaptation layer switching can be incorporated into an ATM private network network interface (PNNI) reference architecture to provide a mini channel connectivity layer and a routing architecture for establishing connections in the adaptation layer.

The arrangement and method facilitates both scalability of the network and the separation of call routing and connection control. The advantage of this separation of the two functions can be exploited by making routing decisions at the outset. Dynamic trunking allows the routing decisions to be independent of the connection control. With fixed trunk networks, voice routes are made up of small trunk groups that pertain to physical links which may be diversely connected. The status of these connections will affect the final route available. Because the status is distributed, so must be the routing, and hence there can then be no separation.

The arrangement and method further facilitate the simplification of the PNNI model to reduce hierarchy, obviate crank back and alternate path routing, and simplify call admission policy on a service related basis.

PNNI may be applied to dynamic trunking in the adaptation layer using ATM connections to represent the physical bearer, but additionally the virtual connectivity allows dual homing, load-balancing, diverse routing and virtual connections may be re-established automatically over alternative physical paths to maintain connectivity. This enables the construction of an extremely robust network.

Reference is here directed to our co-pending application No. GB-9614138.7. This application describes a telecommunications system comprising an asynchronous transfer mode (ATM) network having uncommitted bandwidth, and a plurality of adaptive grooming routers (AGR) coupled to the network. The AGRs comprise a group adapted to function as a virtual transit exchange whose fabric and control are distributed over the group. The virtual transit exchange comprising the AGRs incorporates independent connection control and call routing functions and has means for determining the current system status whereby to set up narrow band connections across the ATM network based on that status determination.

BRIEF DESCRIPTION OF THE DRAWINGS

Embodiments of the invention will now be described with reference to the accompanying drawings in which.

DESCRIPTION OF PREFERRED EMBODIMENT

Figure 1:
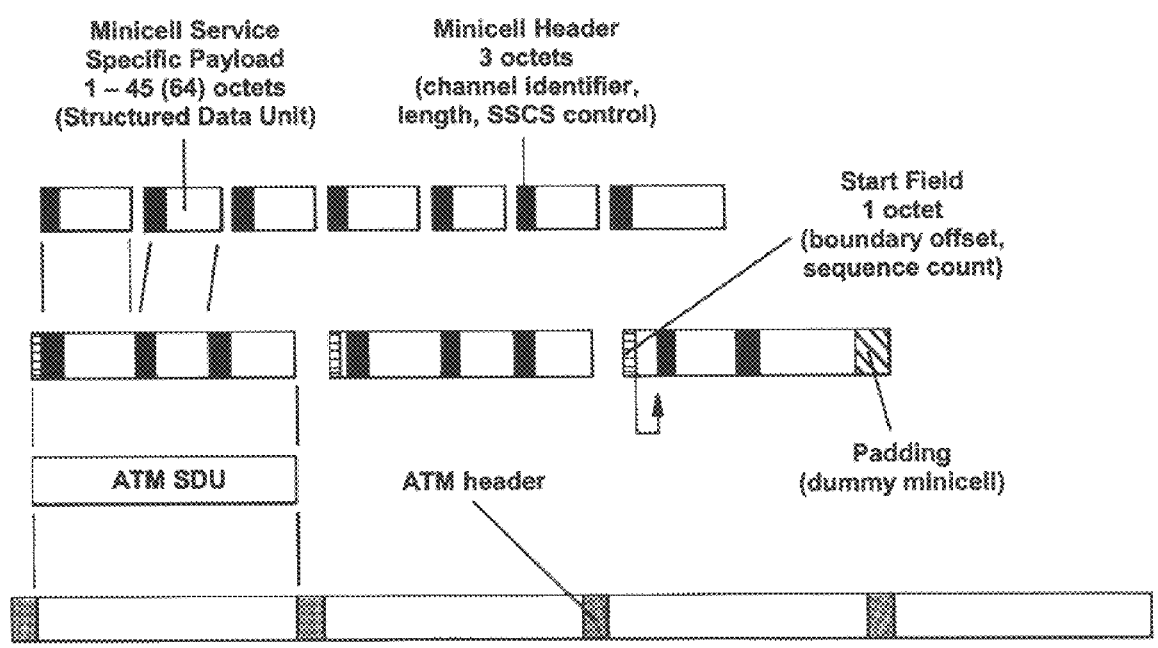
FIG. 1 illustrates the multiplexing of minicells into ATM.

Referring first to FIG. 1, this illustrates the way in which AAL-2 minicells are multiplexed into ATM. The AAL-2 adaptation layer has been optimised to cope with the demands of low bit-rate communications, representing the increasing trend to greater voice compression. The adaptation layer is a multiplex of users in a single ATM connection, where each user's information is carried in a short packet or minicells, with a header identifying the user channel with ancillary control information (see FIG. 1). This is a dynamic trunk group of users in a single connection, and thus the routing techniques described in our aforementioned co-pending application No. 9614138.7 may be applied. Each minicell has a service specific payload and a three octet header containing typically the channel identifier, the cell length and the SSCS control. The minicells are multiplexed into ATM cells each of which is provided with an ATM header. Where appropriate, dummy minicells are inserted as padding in the ATM cells.

By sharing the fixed length payload of the ATM cell between users, the compromise of trading cell assembly delay for bandwidth efficiency is neatly side-stepped, a sacrifice which would be acute at low bit-rates and on expensive leased lines. AAL-2 adaptation equipment performs a concentration function to ensure high utilisation, but can also limit the holdover delay of traffic when usage is low.

A further feature of minicells is that they may be of variable size, from 1 to 64 octets, to accommodate a wide variety of applications with minimal overhead. Thus the mapping to ATM cells is asynchronous and in fact quite independent of the length of an ATM cell. The boundary of minicells in the ATM cell payload is signified in every cell by a start field (STF), which specifies the offset, and thus minicells form a self-delineating flow.

Minicells provide a universal adaptation medium able to support voice, video and data in a common ATM VCC. In the access segment of the network, such a connection can be carried transparently over video distribution systems using MPEG transport stream, narrow band systems with 64 kb/s capacity, n×64 kb/s, or a modem channel without any loss of flexibility or efficiency. The result is a multimedia service transport which is transparent to practically all physical transport systems, but which is at the same time fully integrated into ATM.

Figure 2:
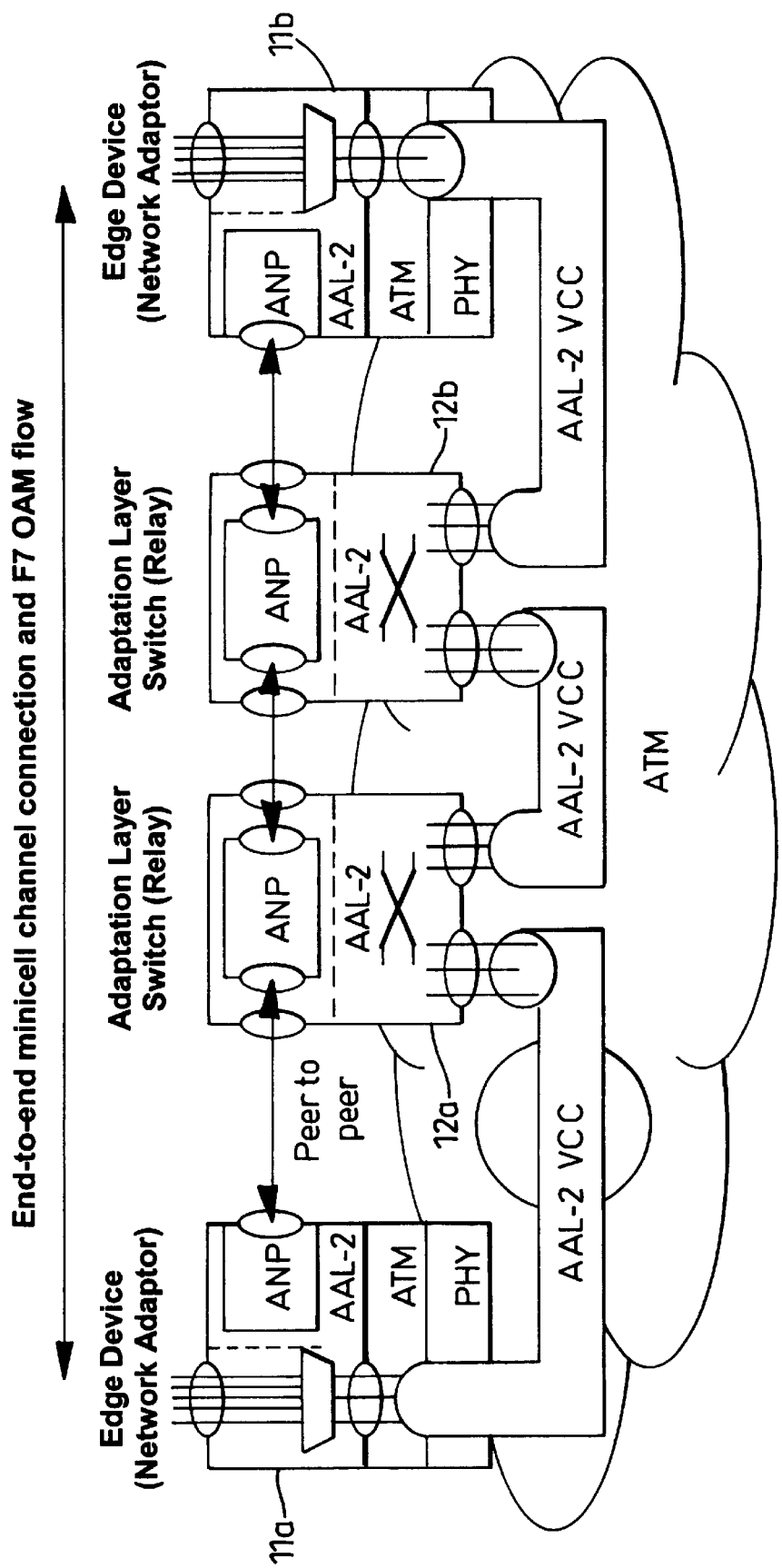
FIG. 2 is a schematic diagram of an ATM adaptation layer switching network illustrating end to end minicell connection and traffic flow.

Referring now to FIG. 2, this illustrates end to end flow of traffic between network adaptors 11a, 11b via adaptation layer switches 12a, 12b. The AAL-2 standard specifies a feature that allows minicells to be relayed between connections, without the need to terminate the carried service as illustrated in FIG. 2. This provides the ability to establish and control a minicell channel (adaptation layer) connection across many nodes forming an adaptation layer switching network.

The set-up, maintenance and clear-down of minicell channels in an AAL-2 connection, and the switching operation of the relay, is controlled by the AAL-2 Negotiation Procedures (ANP). AAL-2 connections are supported by in-band F7 OAM minicells, replicating for the adaptation layer the connection maintenance capabilities of ATM.

Figure 3:
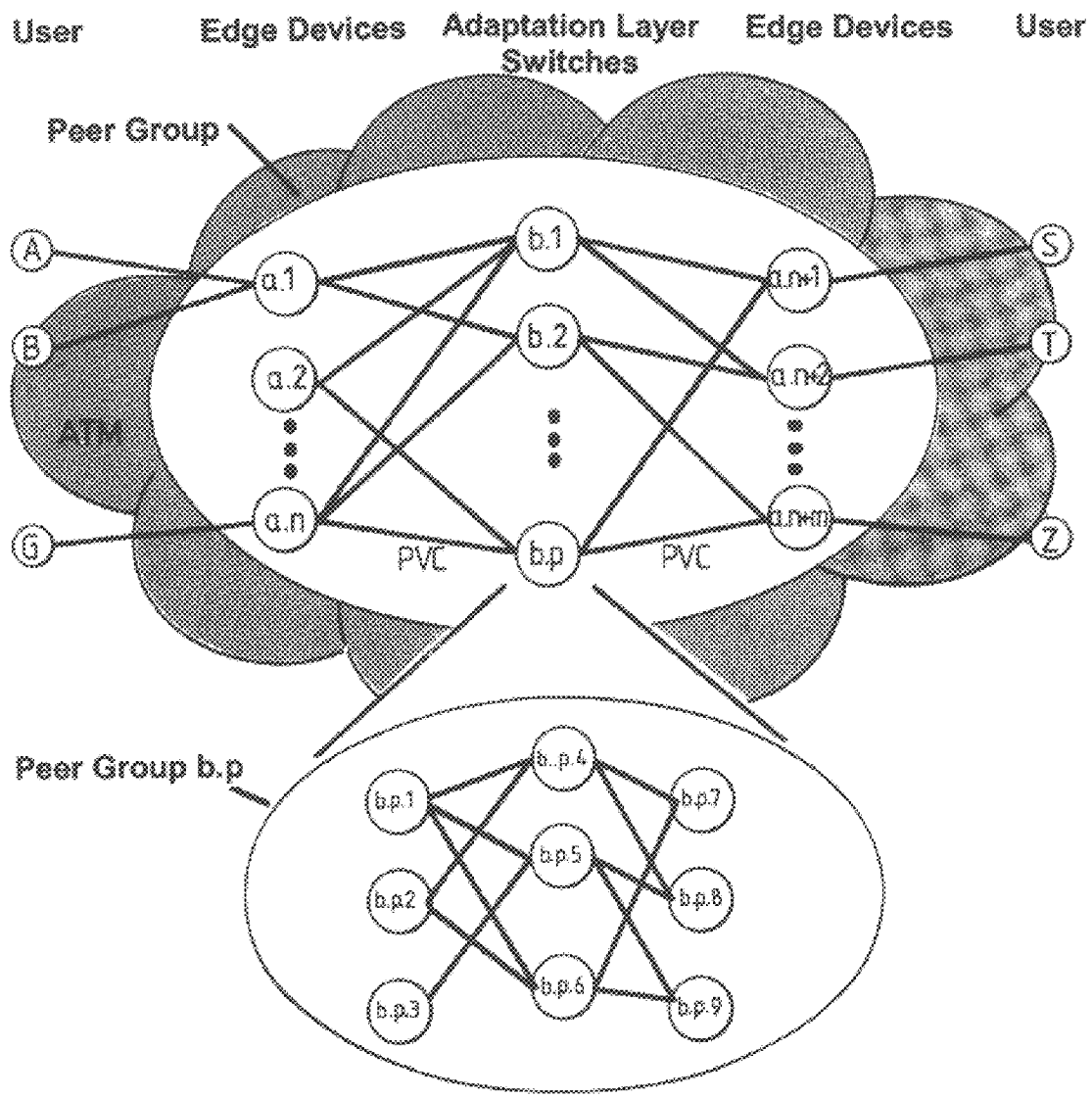
FIG. 3 illustrates the architecture of an adaptation layer switch employed in the network of FIG. 2.

An adaptation layer switching network and node architecture is shown in FIG. 3, highlighting the adaptation layer nodes. The connectivity is provided by Switched and Permanent VCs (SVC/PVC) in the ATM layer, which has not been shown, but behaves as a virtual connectivity backplane. In FIG. 3, the nodes have been arranged and annotated using the ATM Forum PNNI notation for the description of peer groups, which are a convenient form of routing abstraction to form a Logical Group Node (LGN) from physical nodes or other LGNs in a hierarchical manner.

For this adaptation layer technology, only two layers of hierarchy are necessary to build a massively scaleable network. The lowest layer is the Adaptation Layer Switch (ALS) which is an LGN formed from physical ports and a single stage distributed core, and may represent collocated, and commonly controlled and managed physical devices. Similarly, Edge Devices (ED) not shown in detail, share much common technology with the ALS, with the addition of a service specific interworking function. The top level is a network level peer group comprising a symmetrical and analogous meshed connection of ALSs and Edge Devices.

Using AAL-2 VLSI technology described later, ALS nodes can support of the order of a million 64 kb/s circuits with today's technology, and an order of 10s of millions of low-bit-rate voice connections. Thus the network shown with a single switching stage can scale easily to global proportions. More hierarchical levels and switching stages can be used with no loss of applicability of the routing and congestion controlling mechanisms. However, the simplicity and symmetry of the network shown allows straightforward congestion management by load-balancing and rejection of blocked traffic at source. This yields the highest bandwidth utilisation, from a minimum sufficiency of ALS nodes, to meet any QoS targets on call blocking. The ALS can be designed to be a fully non-blocking node to improve throughput, and ensure stable behaviour under overload conditions.

The advantages of scaling and low blocking probability are achieved by AAL-2 connections effectively operating as Dynamic Trunk Groups (DTG). These correspond to virtual trunk groups of an adaptive grooming router. An AAL-2 connection is a multiplex of users in a virtual channel, that has a concentrating function to ensure high utilisation, but also has high efficiency since the connection can be configured as a Deterministic Bit Rate (DBR) service and share a very large physical or virtual pipe.

The completed ATM Forum PNNI phase 1 specification allows for the dynamic behaviour of a network; changing link state parameters can be carried in PNNI Topology State Packets (PTSP), for example to inform nodes within the same peer group of a change in available bandwidth. In the single stage network of FIG. 3, knowledge of the available bandwidth end-to-end is easily obtainable, and permits the ultimate success of routing any given call, to be assessed at the source ED from a relatively up-to-date view of congestion in the network.

With regard to monitoring dynamically changing bandwidth, the PTSPs can be transmitted with fixed periodicity, or by crossing thresholds or triggers, optimised to achieve highest network bandwidth utilisation and near zero call blocking probability under normal load, for a minimal overhead. This is equivalent to the advertisement procedure of our aforementioned co-pending application No. 9614138.7. PNNI Parameters such as Mean Available Cell Rate (Mean ACR) and a link administrative weight for route priority can be used to load balance traffic to further avoid localised congestion. Load-balancing and the simplicity and symmetry of the network, diverse logical or physical path routing combined with PNNI soft PVCs, ensure a resilient network can be built.

The ED can apply both a service related and the PNNI Generic Call Admission Control (GCAC), by determination of the route, and by prediction based on available bandwidth—knowledge of both it has at the effective edge of the network. An analogous procedure is described in our aforementioned co-pending application No 9614138.7. From this the ED can determine the probability of successful call establishment, such that blocked traffic can be rejected at source. In PNNI terminology, this route determination results in a Designated Transit List (DTL) that requires no further routing decisions at the intermediate ALS nodes. The ED's complete view of the network means that the crank back and alternate path routing of PNNI need not be implemented. The ALS physical nodes can run a PNNI Actual Call Admission Control (ACAC) to ensure that carried traffic does not exceed particular criteria, and to correctly intercept race conditions. This corresponds to grooming or trunking capacity of an adaptive virtual junctor or adaptive grooming router node in our aforementioned co-pending application No 9614138.7. The residual very low probability of blocking means that a blocked call can be released back to the source, rather than attempt alternatives within the network.

Figure 4:
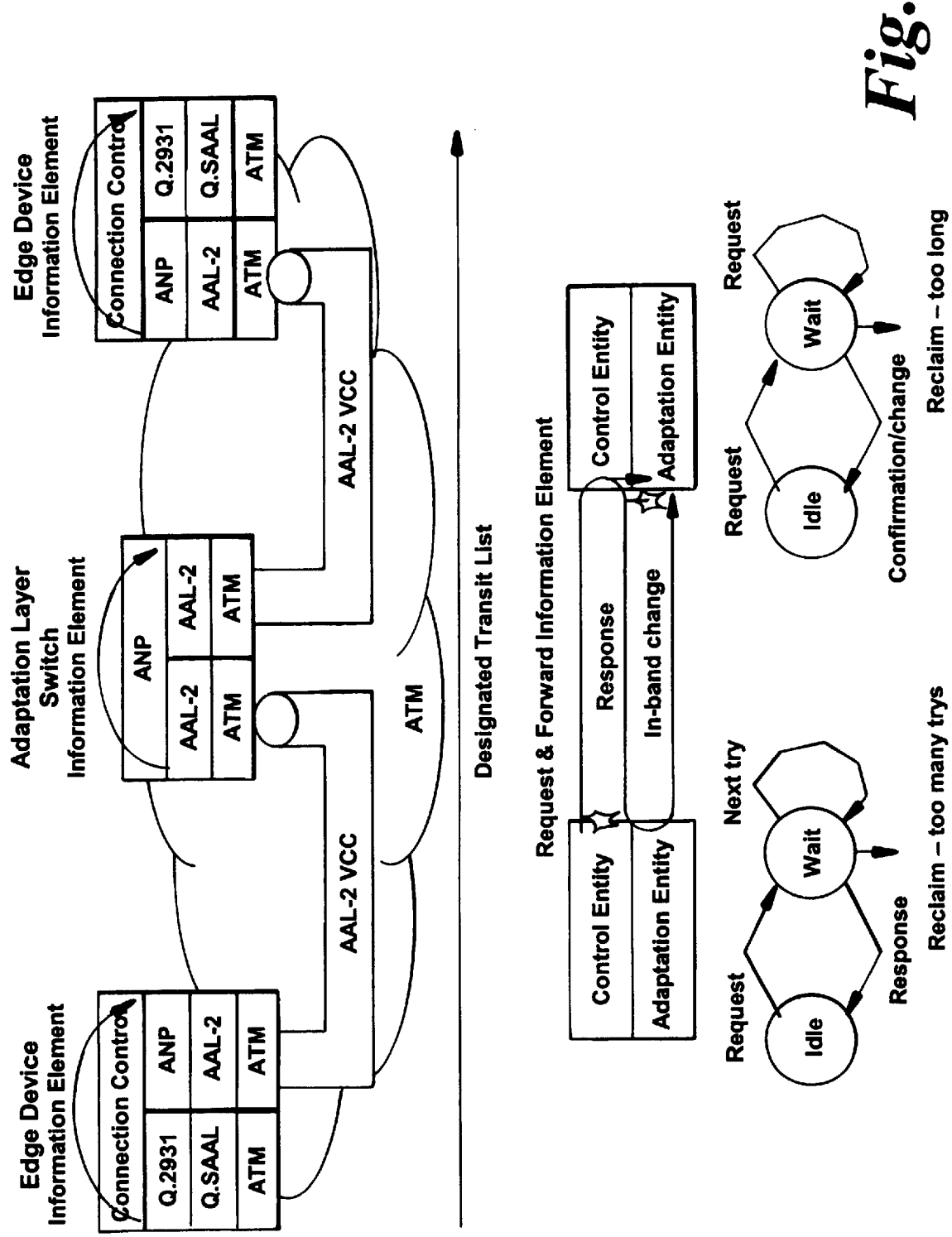
FIG. 4 illustrates routing in the network of FIG. 2.

FIG. 4 depicts the adaptation layer connection establishment mechanism which is a straightforward extension of the PNNI protocol. The AAL-2 standard specifies a network architecture that comprises adaptation nodes that are the Edge Devices (ED) and relay nodes that is the ALS shown in FIG. 4. As mentioned earlier, the standard also specifies a connection management protocol called Adaptation Negotiation Procedures (ANP).

The ANP can operate on a link-by-link basis, but can also be cascaded to provide end-to-end connectivity in a robust manner. The figure shows a two-state Finite State Machine (FSM) at both the transmitter and receiver, which corresponds to one AAL-2 VCC. The ANP protocol with regard to the set-up and release of minicell channels, is basically a "request-response-action" handshake protocol.

To set-up a minicell channel the transmitter, normally in the idle state, sends a request to the receiver, and by that action it has committed itself to effect the change. Consequently the transmitter expects a response. It will retry at certain intervals in case the response was lost, before deeming a receiver failed so that the transmitter can simply reclaim the channels in the AAL-2 VCC to that receiver. A response of acceptance or denial takes the transmitter back to the idle state.

The receiver operates in an analogous manner, but is slaved to the transmitter's request messages. When a request is received, the receiver sends a response and moves out of the idle state. The receiver's normal expectation is that its affirmative response will be accepted by the transmitter, which is already committed. Therefore the receiver commits to providing resources for the channel. A transition back to the idle state is effected when a confirmation is received explicitly, or implicitly by receipt of the first minicell with the new channel or an in-band indication. If no form of confirmation is received, and a relatively long time-out has expired, the receiver can deem that transmitter to have failed and reclaim any resources it used.

The PNNI protocol determines the routing as a Designated Transit List (DTL) as described earlier, and this is provided as an Information Element (IE) in the originating Q.2931 set-up or add party messages that would normally invoke SVC set-up in the ATM layer. This routing determination, which corresponds to the route or "worm" of our co-pending application No 9614138.7, is easily adapted to AAL-2 technology. Signalled directly, Edge Devices can extract the IE from Q.2931 and use it directly in an ANP set-up message. This constitutes connection control and provides the routing description to direct the cascade of minicell channel connection establishment between adaptation layer nodes. Consequently the ATM network can be configured using PVCs, although this does not exclude the use of SVCs and thus guarantees the grade of service.

Logical nodes with aggregated hierarchy such as the ALS in FIG. 4 can add nested levels of DTL to the IE to route across their collocated physical modules in an equivalent manner. The robustness of the single ANP stage allows a pipelined forwarding of the IE, and a single point of entry means that the network operates as one logical switch.

Connection control can establish from the outset those voice routes which are not reachable due to internal congestion. By knowing the capacity available on the AAL-2 connections, because these can support a dynamically varying number of calls, connection control knows from congestion criteria whether it can dilate the bandwidth of any particular AAL-2 connection and what the greatest likelihood of success will be for any given choice. This provides a facility to block routes which are unreachable in the network at the outset. By rejecting calls with as small amount of processing as possible then, when the system is heavily overloaded there is reduced processing and signalling generated for calls which can not currently be established across the network. By providing this essentially negative feedback scheme, a call can be rejected at the periphery of the ALS network before an abortive attempt to route the call across the network and thus a high degree of carried traffic can be maintained. Connection control can achieve a load balancing capability with voice routes which are of equal priority.

The AAL-2 connections could be given for example a PNNI LGN designator, or a geographic location, or reach or distance indicator, and thereby the congestion could be sent out only to a restricted set of nodes for example if the distance is below a certain threshold with an associated congestion threshold, thereby only ALSs within a given geographic locale or PNNI LGN will get signalled first and as congestion increases then it could spread to the wider ALS network system. One can envisage any scheme of selection criteria for any advantageous purpose, which may be select or universal in application.

The arrangement and method described provide for the distribution of the ALS in terms of its fabric and its control and its enabling technologies with reference to dynamic trunking concepts. There is uncommitted bandwidth within the fabric and consequently routing decisions can be fully independent of the operation of this distributed fabric. The distributed fabric can, because of this unallocated bandwidth use separate connections to the control layer for establishing the connections through the fabric and this in no way compromises external decisions that are made except when an overload situation is encountered. An advertising process using PNNI PTSPS provides knowledge of the distributed fabric. This includes local knowledge about a remote site such that routing decisions can be made and modified where necessary so as to reject traffic at source. The dynamic trunking enables the separation of call routing and connection control. The arrangement also provides a means of ensuring stability under overload situations and minimising the cost of handling traffic which would be rejected by destinations.

The separation of call routing and connection control together with advertising the system status ensures a wide range of scaleability so that the application of dynamic trunking technology provides scaleability in a traffic sense. Further, the separation of call routing and connection control provides a distributed computing environment which is scaleable and managed by this advertisement resource. Because the distributed exchange manages its own internal traffic, effectively it provides means for balancing that traffic to the fabric and makes its own internal routing decisions. The separation further provides a facility to support a wide range of services using other signalling schemes. The fabric provides a connection engine that can accommodate a wide variety of signalling protocols appropriate for the type of service to be provided and that can set up connections.

The full knowledge of the network connectivity and the release of resources can be enabled by any node within the network, as it can trace through all connections from any starting point. This can be used to support failure recovery.

It will be appreciated that although the arrangement and method have been described above with particular reference to current standard protocols, it is in no way limited to the use of these particular protocols.

It will be understood that the above description of a preferred embodiment is given by way of example only and that various modifications may be made by those skilled in the art without departing from the spirit and scope of the invention.

What is claimed is:

1. A method of routing telecommunications traffic in an asynchronous transfer mode (ATM) adaptation layer switching network comprising a plurality of nodes arranged in peer groups and having uncommitted bandwidth, there being a plurality of adaptation layer switches (ALS) coupled to the ATM network, which adaptation layer switches comprise a group adapted to function as an adaptation layer switching network whose fabric and control are distributed over the group, the method including determining the current system status and bandwidth availability, and effecting routing decisions at the network edge consequent on said bandwidth determination whereby to set up multimedia calls across the network.

2. A method as claimed in claim 1, wherein said routing is effected via a Private Network Network Interface (PNNI) signalling protocol.

3. A method as claimed in claim 2, wherein changing link state parameters are carried within PNNI topology packets whereby to inform a set of network nodes within a peer group of a change in available bandwidth.

4. A method as claimed in claim 3, wherein the PNNI protocol controls the adaptation layer of the network.

5. A method as claimed in claim 4, wherein route determination between network nodes comprises a designated transit list (DTL) that requires no further routing decisions at the intermediate nodes.

6. A method as claimed in claim 5, wherein the route determination proceeds in a hierarchical manner according to the PNNI protocol, wherein the network nodes comprise hierarchical logical groups, wherein a designated transit list determines the route between designated network nodes, and wherein the routing within a said logical group is determined on entry to that group.

7. A method as claimed in claim 6, wherein the designated transit list is provided as an information element in an originating set-up or add-party message for invoking SVC set-up in the ATM layer.

8. A method as claimed in claim 6, wherein call admission is effected on a service related basis.

9. A method as claimed in claim 6, wherein said adaptation layer is an AAL-2 adaptation layer.

10. A method as claimed in claim 9, and including determining availability of a destination, and rejecting at source traffic to that destination in the event that the destination is unavailable.

11. An asynchronous transfer mode (ATM) adaptation layer switching network comprising a plurality of nodes arranged in peer groups and having uncommitted bandwidth, and a plurality of adaptation layer switches (ALS) coupled to the ATM network, which adaptation layer switches comprise a group adapted to function as an adaptation layer switching network whose fabric and control are distributed over the group, the network having means for determining its current system status and bandwidth availability, and means for effecting routing decisions at the network edge consequent on said bandwidth determination whereby to set up multimedia calls across the network.

12. A network as claimed in claim 11, and having means for determining availability of a destination, and for rejecting at source traffic to that destination in the event that the destination is unavailable.

13. A network as claimed in claim 11, wherein the routing mechanism for determining the availability of a destination and for rejecting traffic to that destination as source is independent of the scale of the network.

* * * * *